United States Patent

Conant, Sr.

[15] 3,646,367

[45] Feb. 29, 1972

[54] ELECTRICAL SWITCH

[72] Inventor: Paul L. Conant, Sr., Richardson, Tex.

[73] Assignee: Collins Radio Company, Dallas, Tex.

[22] Filed: Jan. 5, 1970

[21] Appl. No.: 532

[52] U.S. Cl. ....... 307/255, 307/313, 307/296

[51] Int. Cl. ....... H03k 17/56

[58] Field of Search ....... 307/296, 300, 254, 255, 313, 307/290

[56] References Cited

UNITED STATES PATENTS

| | | | |
|---|---|---|---|
| 3,210,561 | 10/1965 | Ullman | 307/254 |
| 3,281,639 | 10/1966 | Potter | 307/296 |
| 2,906,941 | 9/1959 | Brolin | 307/296 |
| 2,975,301 | 3/1961 | Straube | 307/296 |
| 3,374,366 | 3/1968 | Kleinberg | 307/255 |
| 3,446,988 | 5/1969 | Ogawa | 307/255 |
| 3,315,090 | 4/1967 | Bruffey et al. | 307/255 |
| 3,246,210 | 4/1966 | Lorenz | 307/315 |
| 3,188,495 | 6/1965 | Grimm | 307/315 |
| 3,435,257 | 3/1969 | Lawrie | 307/291 |

*Primary Examiner*—John S. Heyman
*Assistant Examiner*—Harold A. Dixon
*Attorney*—Henry K. Woodward and Robert J. Crawford

[57] ABSTRACT

An electrical switch for large currents including a transistor element which is driven into saturation upon closing said switch. Means is provided to cause forward biasing of the base-collector junction of said transistor to force transistor current saturation.

2 Claims, 2 Drawing Figures

PATENTED FEB 29 1972 3,646,367

INVENTOR.
PAUL L. CONANT, SR.
BY H. K. Woodward
ATTORNEY

ELECTRICAL SWITCH

This invention relates to switching circuits, and in particular to switching circuits for large currents.

Switches for relatively large currents, e.g., 10 amperes or greater, are required in a number of applications such as line printer solenoids, power amplifiers, power supplies, and cathode-ray tube deflector circuits. The speed of a transistor switch, having a transistor element which is driven into saturation, is normally regarded as being a function of the forward current gain parameter, $h_{FE}$, of the transistor. To achieve greater switch speed, especially when large currents are switched, a higher value $h_{FE}$ is usually required, which consequently increases cost.

An object of this invention is an improved transistor switch circuit suitable for rapidly switching large currents.

Another object of the invention is an improved transistor switch circuit which achieves increased switching speed without the requirement for transistors having a high $h_{FE}$ parameter.

Still another object of the invention is an improved transistor switch circuit including a transistor element which may be rapidly driven into saturation.

A feature of the invention is means for providing peremptory transistor saturation through forward-biasing the base-collector junction.

Figure 1:
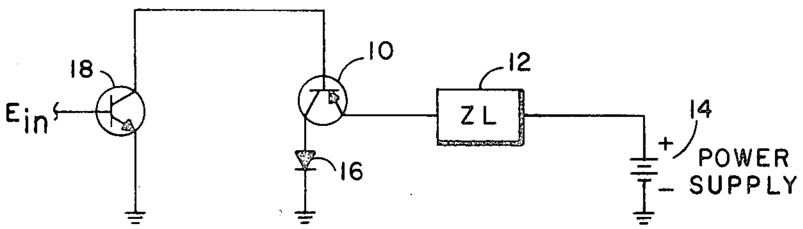
Figure 2:
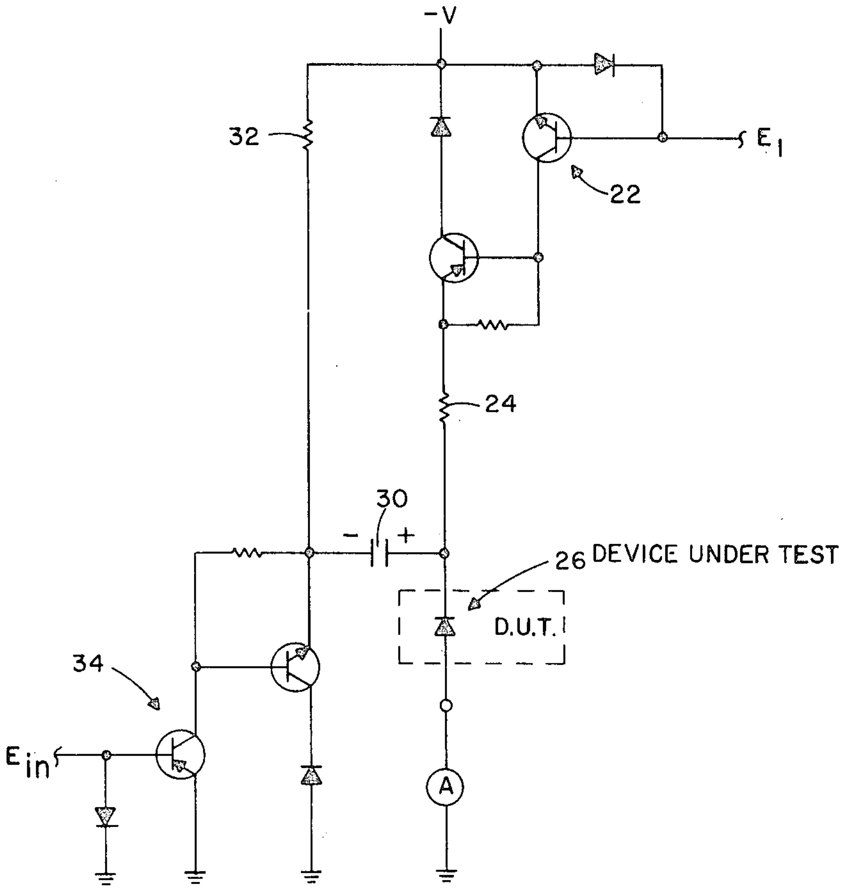

These and other objects and features of the invention will be more fully understood from the following detailed description and appended claims when taken with the drawings, in which:

FIG. 1 is a simplified schematic of a switching circuit in accordance with the present invention, and FIG. 2 is a schematic of a switch circuit in accordance with the present invention which is designed to rapidly switch large current pulses to a semiconductor device under test.

Referring now to FIG. 1, a switch circuit in accordance with the present invention includes a PNP-transistor 10 the emitter electrode of which is serially connected through a load 12 to a positive power supply 14. The collector electrode of transistor 10 is serially connected through diode 16 to circuit ground. Typically, load 12 may be a line printer solenoid or the like wherein a relatively large current pulse of short duration is required. In accordance with the present invention a sharp pulse of current is provided by rapidly driving transistor 10 from a nonconducting state into saturation. This is achieved by driving transistor 10 with a second transistor 18 of NPN type having its collector electrode connected to the base electrode of transistor 10 and the emitter electrode connected to circuit ground. A trigger signal, $E_{in}$, is applied to the base of transistor 18.

In operation, with no trigger signal applied to the base of transistor 18, transistors 10 and 18 will be nonconducting. Upon application of a small positive voltage to the base of transistor 18, transistor 18 is rendered conductive (but not necessarily in saturation) which forces the potential on the collector of transistor 18 to near ground level. Likewise, the ground potential is applied to the base of transistor 10 thereby rendering transistor 10 conductive.

The current through a transistor is in the saturation region when the base-collector junction of the transistor is forward-biased. Consider now the voltage across the base-collector junction of transistor 10 upon the application of a ground potential to the base of transistor 10. Since transistor 10 is a PNP type, for transistor saturation the collector of transistor 10 must be at a high voltage potential than the base, thereby having a forward bias on the base-collector junction. It will be noted that upon the initial conduction of transistor 10 by the application of a ground potential on the base of transistor 10, a current flows through load 12, transistor 10 and diode 16. The voltage drop across diode 16 places the collector voltage of transistor 10 slightly above ground potential. Thus, the collector potential is higher than the base potential thereby rendering the collector base forward biased and placing transistor 10 in saturation. It will be observed that the potential on the base of transistor 10 also is slightly above ground potential due to the voltage drop across transistor 18, but by proper selection of circuit elements the voltage drop, $V_{cr}$, of transistor 18 is less than the forward voltage drop, $V_{cr}$, of diode 16. In one embodiment a 2N3055 transistor was used for transistor 18 and a 1N1202 diode was used for diode 16.

FIG. 2 is an electrical schematic of a test circuit employing two switch circuits in accordance with the present invention for providing large current pulses to a semiconductor device under test. A first switch circuit shown generally at 22 is serially connected with a resistor 24, the device under test 26, and an ammeter 28 between a negative voltage source and circuit ground. Upon application of a positive trigger signal $E_1$ to the input of the switch circuit 22, a large surge of current flows through switch 22 and the device under test 26, for example a power rectifier as illustrated. Concurrently, capacitor 30 which is serially connected with a resistor 32 between the negative voltage source and the device under test 26, is charged to a high voltage potential, as illustrated.

A second switch circuit shown generally at 34 is connected between the common terminal of capacitor 30 and resistor 32 and ground. Switch circuit 34 is rendered conductive by the application of a positive trigger signal, $E_2$, simultaneously with the removal of the trigger signal $E_1$ from switch circuit 22. The conduction of switch circuit 34 provides a discharge path for capacitor 30 through the device under test 26, and a large positive current pulse is then applied to the device under test 26 for analysis of the reverse bias breakdown characteristics of the device under test.

As above described, the switch circuit in accordance with the present invention may be advantageously employed in a number of applications wherein large current pulses of short duration are required. It will be appreciated that opposite conductivity type transistors may be employed. While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. An electrical switch for switching large currents through a load comprising:

a. a first PNP bipolar transistor having an input electrode, an output electrode, and a control electrode;

b. a small diode resistance means having first and second electrodes;

c. means connecting the anode of said diode resistance means to said output electrode of said first transistor;

d. a second NPN bipolar transistor having an input electrode, an output electrode and a control electrode;

e. means connecting said output electrode of said second transistor to said control electrode of said first transistor;

f. means connecting said input electrode of said second transistor to the other electrode of said resistance means;

g. said control electrode of said second transistor functioning as the control terminal of the electrical switch and controlling the conductivity of said second transistor; and h. means connecting said load to said input electrode of said first transistor.

2. An electrical switch for switching large currents through a load comprising:

a. first NPN bipolar transistor having an input electrode, and output electrode, and a control electrode;

b. a small diode resistance means having first and second electrodes;

c. means connecting the cathode of said diode resistance means to said output electrode of said first transistor;

d. a second PNP bipolar transistor having an input electrode, an output electrode and a control electrode;

e. means connecting said output electrode of said second transistor to said control electrode of said first transistor;

f. means connecting said input electrode of said second transistor to the other electrode of said resistance means;

g. said control electrode of said second transistor functioning as the control terminal of the electrical switch and controlling the conductivity of said second transistor; and h. means connecting said load to said input electrode of said first transistor.

* * * * *